United States Patent [19]

Wilmsen, deceased

[11] 4,038,037
[45] July 26, 1977

[54] APPARATUS FOR THE MANUFACTURE OF HOMOGENEOUS, FINE-PORED SYNTHETIC RESIN FOAMS

[76] Inventor: Hans Wilmsen, deceased, late of Essen, Germany, by Joerg Wilmsen, heir

[21] Appl. No.: 504,742

[22] Filed: Sept. 10, 1974

[51] Int. Cl.² .............................................. B01J 8/00
[52] U.S. Cl. .............................. 23/288 R; 23/252 R; 23/285; 23/288 E; 252/359 E; 260/2.5 F; 261/DIG. 26
[58] Field of Search ................. 23/288 R, 252 R, 285, 23/288 E; 252/359 E; 261/DIG. 26; 260/2.5 F, 2.5 BC, 2.5 AK; 169/14, 15; 259/4; 239/343

[56] References Cited

U.S. PATENT DOCUMENTS

| | | | |
|---|---|---|---|
| 2,090,727 | 8/1937 | Gosmann | 261/DIG. 26 X |
| 2,376,122 | 5/1945 | Clifford | 252/359 E X |
| 2,764,565 | 9/1956 | Hoppe et al. | 23/288 R X |
| 2,860,856 | 11/1958 | Bauer | 260/2.5 E X |
| 3,031,271 | 4/1962 | Weinbrenner et al. | 260/2.5 BC X |
| 3,043,670 | 7/1962 | Vieli | 23/252 R X |
| 3,150,108 | 9/1964 | Vieli | 23/252 R X |
| 3,256,067 | 6/1966 | Shriver et al. | 23/252 R X |
| 3,434,805 | 3/1969 | Bar | 252/359 E X |
| 3,486,862 | 12/1969 | Unterstenhoefer | 260/2.5 E X |
| 3,963,650 | 6/1976 | Ogden | 23/252 R |

Primary Examiner—Morris O. Wolk
Assistant Examiner—Arnold Turk
Attorney, Agent, or Firm—Brooks, Haidt, Haffner & Delahunty

[57] ABSTRACT

An apparatus for the continuous preparation of a homogeneous fine-pored synthetic resin foam, which comprises in combination a foaming chamber having one or more nozzle inlets and an outlet, a circulation hose attached at one end to the said outlet and at the opposite end to a first mixing chamber with a nozzle device, and one or more subsequent mixing chambers with nozzles for the carrier foam and additives, the said mixing chambers not being subdivided and being free from baffle plates, screws or stirrers.

10 Claims, 1 Drawing Figure

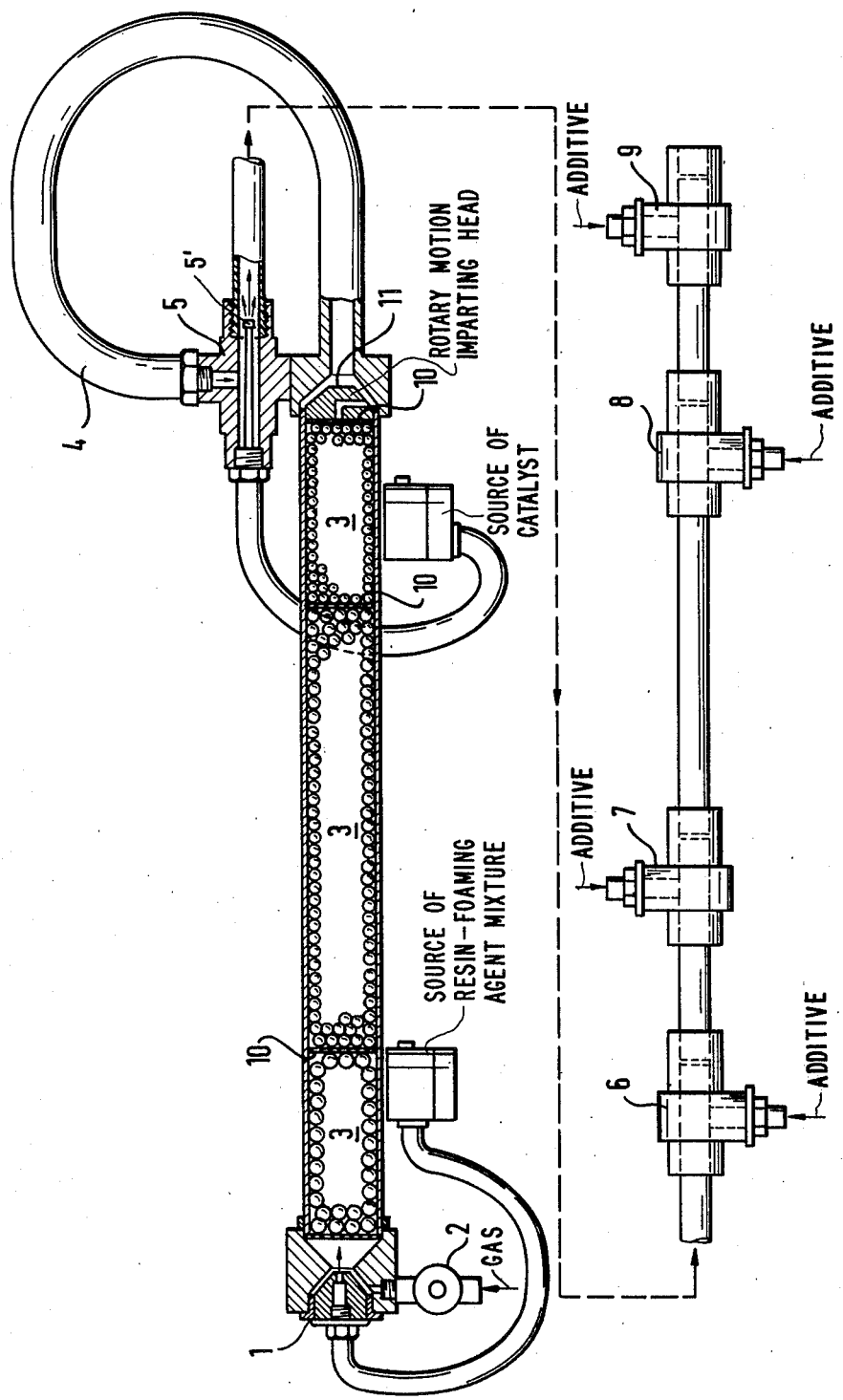

APPARATUS FOR THE MANUFACTURE OF HOMOGENEOUS, FINE-PORED SYNTHETIC RESIN FOAMS

This invention relates to an apparatus for the continuous preparation of foams from synthetic resins, particularly resins based on aqueous or aqueous-alcoholic formulations, and to a process using such apparatus. As well as an alcohol such as, for example, methanol, it is possible to use other water-miscible organic solvents which do not impair the forming agent used, and the curing reaction.

Using the apparatus according to the invention, it is possible to foam synthetic resins based on aqueous and/or aqueous-alcoholic or aqueous-water-miscible organic solvent formulations, by themselves or as mixtures. As synthetic resins to be used at least in part, aminoplasts are particularly preferred. These and other synthetic resins, additives and their combinations, as well as catalyst systems, have been described, for example, in Swiss patent application No. 12,235/73 filed Aug. 27, 1973.

Apparatuses for the manufacture of synthetic resin foams are known. However, because of inherent disadvantages, these have not yet proved completely satisfactory. These disadvantages will be explained briefly using as an example commercially available apparatus for the manufacture of amino-plast foams.

In known apparatuses, the foaming agent is in general first foamed together with the catalyst, and the aminoplast resin is then mixed in, without there being provided a spatial separation of the foaming chamber from the mixing chamber in which the acid foaming agent is mixed with the aminoplast resin. However, the foaming agent foam is very sensitive and the foaming effect is very temprature-dependent. For example, in Summer the foaming temperature is, at noon, substantially higher than in the morning. Thus foams of different densities are produced, which is undesirable. Furthermore, the resin nozzle is very rapidly soiled or blocked by the foam, because of the curing of parts of the resin. As a result, in part what is sprayed is merely a foaming agent foam (that is to say containing no synthetic resin, or insufficient synthetic resin), so that the density of the foam is too low.

Furthermore, the mixing of the viscous resin, which is injected into the mobile foaming agent, is often difficult since the formulation may vary greatly due to varying degrees of foaming.

If there is no separation between the foaming chamber and the mixing chamber, the resin may run back into the foaming chamber and cure there. This greatly interferes with, or even prevents, the foaming process.

In other known apparatuses, attempts have been made to achieve good mixing of the foam, catalyst and resin by means of baffle plates or stirring devices within the apparatus (spray gun). Such fitments, however, lead to severe gumming-up and soiling of the equipment, since resin in process of curing settles on them. Furthermore, the mixing chambers required under such conditions are too large to ensure good mixing and the foam, to which the normally acid catalyst has been added, is not forced out of the mixing chamber sufficiently rapidly. With large mixing chambers, dead corners or uncontrollable flows also arise. The resin in such cases already beings to condense and, as a result, its tackiness increases greatly, resulting in soiling.

Such apparatuses are described, for example, in DT-PS No. 1,170,615 or DT-OS No. 1,729,090. In the device of the first-mentioned publication, the coarse foam is converted, in a separate chamber, into a fine foam, whilst the foaming device of DT-OS No. 1,729,090 provides foaming of the foaming agent and subsequent injection of the resin. Furthermore, this know apparatus contains a subsequent mixing unit with comminution elements.

Swiss Nos. 351,400 and 362,222 described devices and processes for the continuous manufacture of a fine foam which comprise first preparing a coarse foam under pressure, which coarse foam is converted, under the action of a pressure gradient over a long throttle zone, into a fine foam, to which additives are added whilst stirring without application of pressure.

The present invention provides an apparatus which, through a novel construction, permits foaming of plastics without the above mentioned disadvantages arising, and overcomes the above mentioned sources of error and also further sources of error.

In particular, the invention improves the characteristics of previously known foamed synthetic resin foams, and also new foamed synthetic resin foams, by means of a trouble-free and uncomplicated apparatus which continuously produces a fine foam via a coarse foam, certain additives being admixed, and in this way modifies the chemical, mechanical and physical properties of the end product.

Furthermore, the invention provides an apparatus and a process which permit the introduction of a plurality of substances which when added simultaneously would have an adverse or interfering effect. In particular, the invention makes it possible to select the most advantageous time for the addition of the various materials though spatial separation and separation in time.

A foam spraying installation incorporating the apparatus of the invention is substantially trouble-free, uncomplicated, and unaffected by the weather, even if several additives are admixed, and allows continuous operation under constant conditions.

In accordance with the invention there is provided an apparatus for the continuous preparation of a homogeneous fine-pored synthetic resin foam, which comprises, in combination a foaming chamber having one or more nozzle inlets and an outlet, a circulation hose attached at one end to the said outlet and at the opposite end to a first mixing chamber with a nozzle device, and one or more subsequent mixing chambers with nozzles for the carrier foam and additives, the said mixing chambers not being subdivided and being free from baffle plates, screws or stirrers.

The foaming chamber of the apparatus preferably contains beads, preferably glass beads, the size of which decreases in the direction of flow of the foam.

According to a preferred embodiment, the apparatus according to the invention, includes a pump for introducing carrier foam into the foaming chamber, a pressure balancing chamber interposed between the pump and the relevant inlet nozzle and controllable air pressure regulators and material pressure regulators at or on the inlet nozzle to the foaming chamber. In fact, it is possible by means of air cushions or a compressible insert to absorb the intermittent pulse of the pump and thereby to achieve a uniform feed.

The process, according to the invention, is carried out by converting the synthetic resin, which has been foamed by means of a foaming agent and compressed gas within the foaming chamber, from a course foam to a fine foam, mixing it with catalyst in the first mixing chamber which is connected to the circulation hose, and feeding additives into the finished but not yet cured carrier foam, with the entire foaming and mixing process taking place controlled only by compressed air gas through a pressure balancing chamber between the pump and the apparatus through air and a material pressure regulator on the apparatus, and the stream of foam in the mixing chamber not being disturbed by any baffle plates, screws or stirrers.

The method of carrying out the process will be explained below in relation to a preferred embodiment of the device according to the invention, with reference to the accompanying drawing.

In the embodiment illustrated in the drawing, synthetic resin mixed with a foaming agent is injected through an inlet nozzle 1, compressed gas and/or air is introduced via inlet nozzle 2, which may be combined with nozzle 1, and the mixture is forced into a foaming chamber 3 which contains beads, preferably glass beads, of differing size, separated by sieves 10. As a result of the initially larger beads and of the compressed gas and/or air, the surface of the foam is initially greatly increased. A coarse-pored foam is produced, which as a result of progressive reduction in the bead size is converted into a fine foam, which has improved thermal insulation and mechanical strength, as a result of smaller and more homogenous cells. At the same time, the turbulence of the foam is converted to a smooth flow, which has a favourable effect on mixing.

In the discharge head 11 of the foaming chamber 3 the foam is caused to undergo a rotary movement as a result of screw-like projections of the discharge head or as a result of a loosely inserted vortex-inducing body, and is fed separately, through a circulation hose 4, into a first mixing chamber 5 where it is mixed with catalyst introduced through a nozzle 5'. The mixing chamber consists of a straight run of pipe of which the cross-section corresponds approximately to the cross-section of the circulation hose through which the foam flows. As is shown in the accompanying drawing, the catalyst is advantageously injected in the direction of flow of the foam.

After mixing the resin foam with the catalyst from nozzle 5' by means of pressure and the vortical motion of the resin foam, and by virtue of the round wall of the mixing chamber, the finished but not yet cured foam, acting as a carrier foam, is passed on through subsequent mixing chambers having nozzles 6-9, these nozzles being located outside the mixing chambers, preferably in a ring-shaped arrangement, in order to increase the vortical movement of the foam or to counteract it. The nozzles 6-9 may be conventional nozzle systems, especially ring nozzles, impact nozzles and baffle nozzles. The individual mixing chambers may be of different lengths and may be threaded and, when assembled together, they give a straight pipe run. They preferably consist of a pipe made from a plastics material. As a result of the spatial separation of the nozzles 6-9 for the additives, the individual mixing processes are separated in time. Since the mixing chambers are defined by the flowing carrier foam and represent a very small mixing chamber, the injection of the additives causes mixing within a matter of seconds. It is thus possible to effect 4 to 5 mixing processes within 2 to 3 seconds, and at times even in less than 1 second.

The equipment is preceded by a gas regulator and one or more liquid regulators which are infinitely variable and which reduce the excessive feed pressure to the values required for the process. The feed hoses from the liquid containers and for the compressed gas and/or air can thus be 100 m. long or even longer. Since controllable air pressure regulators and material pressure regulators are provided at the inlet of the feeds into the apparatus, or directly on the apparatus, it is possible, for example, when carrying out foaming work at a considerable height, to effect foaming without it being necessary to operate and control the supply container and/or compressed air pump at ground level (since this control is effected from the foaming or spraying location).

Given optimum use of the apparatus and of the process, the finished, fully condensed and/or polymerised foam is homogenous, has an even cell structure, exhibits firm bonding and little shrinkage, good thermal insulation and at times sound absorption and a high mechanical strength corresponding to the density. The foam also may show advantageous flameproof characteristics is suitable components are selected.

A. When operating the apparatus according to the invention, the synthetic resin is foamed with foaming agent and compressed gas (compressed air) in a foaming chamber. The catalyst is injected into the catalyst-resin mixing chamber, separated by a circulation hose.

The preceding and subsequent mixing chambers are made as small as possible and have substantially the same diameter as the foam flow pipe. However, deviations of up to 10% are possible.

The end product is a completely condensed and/or completely polymerized synthetic resin foam. The foaming agent and catalyst are only auxiliaries. After the condensation of the resin foam, they represent undesired materials.

The foaming of the resin immediately gives a resin foam of a certain density. The resin nozzle cannot become soiled during this process. The foam (carrier foam) is also no longer significantly disturbed by injecting further material. The resin foam reacts much less to temperature fluctuations than does a pure foaming agent foam. The process also avoids the situation, such as may arise when injecting the resin into the foaming agent foam, that through blockage of the resin nozzle only a foaming agent foam is injected, which foam collapses. The resin foam persists substantially longer than the foaming agent foam. Agents to produce a stiffer foam are superflouous. The additional components have a longer time available for completing reaction, and furthermore less acid is required for the curing reaction.

The critical zone of foam injection apparatuses, for soiling and for mixing, is the resin-catalyst mixing chamber. In the apparatus, according to the invention, the foaming chamber is separated from the resin-catalyst mixing chamber by the circulation hose. As a result, no catalyst can run back into the beads of the foaming chamber. The beads do not stick together.

The cross-section of the first mixing chamber corresponds approximately to the cross-section of the foam flow pipe and of the other mixing chambers, with their connecting pieces. The foam can flow unhindered. In contrast to larger mixing chambers, there are no longer any dead corners which lead to soiling. The resin foam which follows forces the foam mixed with catalyst immediately out of the mixing chamber again, since the foam flow pipe corresponds in size approximately to the size of the mixing chamber or does not differ from it by more than 10%.

B. The mixing takes place as a result of the injection, of the pressure, of the vortical motion of the foam and of the round wall of the mixing chamber.

It is substantially more difficult to achieve good mixing if a more highly viscous resin is injected into a foaming agent foam than it an aqueous catalyst is introduced into an aqueous resn foam. A further substantial advantage is that even with poor mixing the condensation continues in the resin foam and the end product is satisfactory, since it does not collapse.

Hence there are no mixing problems when using the apparatus of the invention. Furthermore, there is also no need for stirring equipment with bristles or wires, or baffle plates, which only lead to soiling and interference with the foam flow and with the formulation.

C. In the resin foaming chamber preferably larger and smaller beads are used, so as to obtain a fine foam from the initially corse foam.

The foaming of the foaming agent is simpler than the foaming of the resin, because of its higher viscosity. Hence, when foaming the resin a higher gas pressure and larger beads are required. This gives a corse-pored foam. This is a considerable disadvantage since the heat insulation of the end product is substantially reduced.

A fine-pored foam is also substantially more stable and more firmly bonded. It has now been found that by reducing the bead size in the foaming chamber from, for example, 8 to 4 mm, with a foam output of 3 to 4 cubic meters per hour, the course foam may be converted directly into a fine foam without significantly modifying the resin foaming process.

It is even possible at the beginning to use larger beads than the normal minimum size, in order to achieve more rapid enlargement of the surface area. The rather corse-pored foam thereby produced is also again converted to a fine foam through the subsequent reduction in the bead size.

Since the foam, at the outlet end of the foaming chamber, is caused to undergo a rotary motion through a screw-shaped construction or through a loosely inserted vortex-imparting body, and since at this point no catalyst is present yet, no gumming-up can occur at this point.

D. In the process according to the invention, the amount of the catalyst solution required is greatly reduced compared to known processes for example, to 30 to 35% of the usual value. Thus, when using an aqueous catalyst solution, less water, which subsequently has to condense out, is required, and this has a significant influence on the shrinkage.

A further advantage of the process according to the invention is that the entire process is controlled only by pressure and by the nozzles, the gas, e.g., air, is both the pressure medium and the conveying and mixing medium, and the stream of foam can flow unhampered by baffle plates, screws or stirrers which lead to disturbances or soiling.

In addition, the individual preceding or subsequent mixing chambers do not have any subdivisions from one another, which could interfere with the flow of foam and they have substantially the same cross-section as the foam flow pipes, which are preferably flexible pipes made from plastics material. This ensures that mixing takes place within seconds and thus it is possible to effect several mixing processes in 1 to 3 seconds or even in less than 1 second.

The point in time at which the individual additives are mixed into the carrier foam can be selected as desired through the spatial separation and time separation, to suit the individual reaction systems. The possibilities of varying the end produce are broad since all values involved in the formulations can be varied. The individual formulations may be decided experimentally. The successive mixing chambers may be screwed together and produce a continuous pipe of approximately constant cross-section.

The apparatus is simple to clean. Remnants of foam are forced out of the apparatus by a surge of gas. Instead of additional rinsing with water, a brief surge of acid also may be useful, so that hardly any working time is expended on cleaning the equipment. The cleaning of the mixing chambers also may be carried out without problems, since there are preferably straight pipe passages (in one embodiment of the invention, the length of the catalyst-resin mixing chamber is approx. 15 cm).

On large building sites and when building high-rise blocks with 20 to 30 floors or more it is becoming progressively more necessary to become independent of the energy sources of the building site, to reduce the filling time and to change the previous pressure vessels which contain 2 cubic meters of resin solution, to large vessels which do not use pressure and which contain 20 to 25 cubic meters of solution, since a trip from the 30th floor to the (foaming) equipment and back loses 20 to 30 minutes working time. Faults and fluctuations in the current supply and also to be expected on building sites. Frequently, the power cable is simply pulled out since there are no longer any connections free on the distribution panel. Hence it is advantageous that the apparatus according to the invention are independent of the building site, and controllable.

This advantage, and the overcoming of pressure differences when foaming at a considerable height, may be achieved by working with gas, e.g., compressed air. For isolated large contains, not using pressure, which may be located at ground level, stirring devices are used to prevent demixing. Instead of using electrical pumps, compressed air transmission pumps are advantageously used, in which the pressure may be transmitted in the ratio of 1 : 2 or even of 1 : 5. Only a relatively small compressor is required for the necessary stirrers, for the air pressure feed pumps, for the transport and pressurizing of the solutions and for the amount of air required for foaming.

Since the process depends on the pressure and on the nozzle, the material pressure and air pressure must be constant before entering the foaming chamber. Hence, a pressure balancing apparatus is interposed between the compressed air pump and the apparatus. Compressed air pumps are using most advantageously in order to be independent of foreign energy sources on the building site. In order to prevent the surging of the compressed air pump, which would considerably interfere with the production of an even homogeneous foam and interfere with the formulation decided on, it has now been found that this substantial source of interference may be eliminated by using a pressure balancing vessel. The balancing may be effected by compression of air or by means of an elastic insert in the pressure balancing vessel.

In the case of a fixed spraying installation in factories for the manufacture of slabs, optionally an electric pump may be introduced.

It does not suffice to set the material pressure and and air pressure on the equipment or on the compressor, since the pressure loss would always have to be reset at 50, 80 or 100 meters height. Hence, in a preferred embodiment of the invention, the liquid pressure and air pressure may be adjusted shortly before, or on, the apparatus, at the optimum point, and the air and/or the solutions are conveyed under excess pressure. This makes it possible for the operators to work the whole day on, for example, the 20th or 30th floor and to carry out all the requisite controls there without having to return to the ground floor, and back again, even once.

When using the apparatus according to the invention in winter, it is advantageous to insulate the kettles and hoses and to heat the trucks. Frost protection agents, such as glycerol, are optionally added to the solutions and, in order to be independent of the degree of hardness of the water, materials such as tri-alkali metal phosphates and di-alkali metal hydrogen phosphates are added, which at the same time act as buffers for the catalyst, which may be acid.

Using the above mentioned measures, the previous foam output per unit time can be almost doubled. Thus, the apparatus operates in a simple, practical and rapid manner.

The apparatus according to the invention, which proves to be of value under the most severe conditions in the building trade, also may be used in other fields, such as agriculture, packaging, shipping, mining, firefighting, combating pests, environmental pollution, oil absorption and problems of objectionable odors or, if followed by a belt installation, for the manufacture of mouldings and many other applications. At the present time, the foam produced according to the invention is predominantly employed at a heat insulation material and also for sound insulation.

I claim:

1. Apparatus for the continuous preparation of a homogeneous, fine-pored, cured, synthetic resin foam with additives therein, said apparatus comprising, in combination, a foaming chamber having an inlet and an outlet spaced from said inlet, at least one nozzle at said inlet for directing materials into said foaming chamber, means containing the synthetic resin and a foaming agent connected to said nozzle and supplying said resin and said agent to said chamber, means for supplying gas under pressure to said inlet, said foaming agent, said gas and said resin foaming a foam-resin mixture without a curing agent for said resin in said foaming chamber, a first mixing chamber with a tubular wall and having a nozzle for directing materials into said mixing chamber, a foam-resin mixture inlet and an outlet spaced from said last-mentioned inlet, a circulation hose connected at one end to said outlet of said foaming chamber for receiving said foam-resin mixture from said chamber and connected to said inlet of said mixing chamber for supplying said foam-resin mixture thereto, means connected to said nozzle of said first mixing chamber for supplying a first additive to said nozzle of said first mixing chamber, a second mixing chamber with a tubular wall and having a nozzle for directing materials into said second mixing chamber, an inlet and an outlet spaced from said last-mentioned inlet, interconnecting means interconnecting said outlet of said first mixing chamber to said inlet of said second mixing chamber for supplying said foam-resin mixture with said additive to said second mixing chamber, and means connected to said nozzle of said second mixing chamber for supplying a second additive to said nozzle of said second mixing chamber, each of said first and second chambers being fee interiorly thereof of baffle plates, screws and stiffers and one of said means for supplying an additive comprising means containing a curing agent for said resin and supplying said curing agent to the mixing chamber to which it is connected.

2. Apparatus according to claim 1, wherein said one of said means in said means for supplying a first additive to said nozzle of said first mixing chamber.

3. Apparatus according to claim 1, further comprising head means at said outlet of said forming chamber for imparting rotary movement to the foamed resin supplied to said hose.

4. Apparatus according to claim 1, wherein said nozzle of said first mixing chamber and said nozzle of said second mixing chamber are ring nozzles.

5. Apparatus according to claim 1, wherein said nozzle of said first mixing chamber and said nozzle of said second mixing chamber are impact nozzles.

6. Apparatus according to claim 1, wherein said circulation hose and said first mixing chamber and said second mixing chamber are made of a plastics material.

7. Apparatus according to claim 1, wherein said foaming chamber contains beads intermediate the inlet and outlet thereof, said beads having a decreasing size in the direction from said inlet to said outlet.

8. Apparatus according to claim 7, wherein said beads are glass beads.

9. Apparatus according to claim 1, wherein each of said mixing chamber and said circulation hose have a circular cross-section and wherein the internal diameters of the mixing chambers do not differ from the internal diameter of said hose by more than 10%.

10. Apparatus according to claim 9, wherein said first and second mixing chambers have different lengths and substantially the same internal diameters.

* * * * *